United States Patent Office 3,512,947
Patented May 19, 1970

3,512,947
COMBINED THERMOFLEXURAL AND
MAGNETOFLEXURAL MATERIAL
Clarence F. Alban, Detroit, Mich., assignor to W. M. Chace Company, Detroit, Mich., a corporation of Delaware
Filed July 11, 1967, Ser. No. 652,436
Int. Cl. B22b 15/00
U.S. Cl. 29—195.5     3 Claims

ABSTRACT OF THE DISCLOSURE

A laminated material for use in making elements which are responsive to temperature changes and to the presence of a magnetic field, the material consisting of at least four laminations, two of which have widely different coefficients of thermal expansion so that an element formed from the composite material will deflect in response to a temperature change, and a second two of which have widely different coefficients of magnetostriction so that in response to an ambient magnetic field an element formed from the material will deflect laterally.

BACKGROUND OF THE INVENTION

Laminated bimetallic elements designed for flexure in response to temperature changes are in wide use. Likewise, laminated bimetallic elements which will flex in the presence of a magnetic field are known. However, there is an absence of a laminated composite material consisting of a combination of individual laminations which are characterized by extreme properties in terms of thermal coefficients of expansion and magnetostrictive coefficients providing for significant response of the material to both temperature change and the presence of a magnetic field.

SUMMARY OF THE INVENTION

Since the corresponding extremes of thermal expansion and magnetostriction do not ordinarily occur in any single material, the composite laminated material of this invention is made of four or more laminations, two of which are specifically provided for obtaining a temperature response and two of which are specifically provided for obtaining magnetic response. The first two laminations are characterized by the fact that one of them has a very low coefficient of thermal expansion and the other one has a very high coefficient of thermal expansion so that there is a wide difference in the coefficients of thermal expansion of these two materials. The second two laminations are characterized by the fact that one of the laminations has a very high positive magnetostrictive coefficient and the other has a very high negative magnetostrictive coefficient. As a result, in the presence of a magnetic field one of these latter two laminations will expand and the other will shrink thereby achieving significant lateral deflection of the element in one direction. If the magnetic field is induced by an alternating current, the laminations will deflect laterally in one direction when the field strength is of a given polarity. When the alternating current magnetic field strength passes through zero, the magnetoflexural effect in the material also becomes zero so the laminations tend to return to their original undeflected positions. When the magnetic field strength reverses polarity, the same magnitude of deflection is obtained in the original direction because magnetostrictive effect is independent of the field polarity. Consequently, if the material is exposed to a magnetic field induced by alternating current in a coil, the material will oscillate at twice the line frequency at a low amplitude.

It is an object of this invention, therefore, to provide an improved laminated material.

Further objects, features and advantages of this invention will become apparent from a consideration of the following description, the appended claims, and the accompanying drawing in which:

Figure 1:
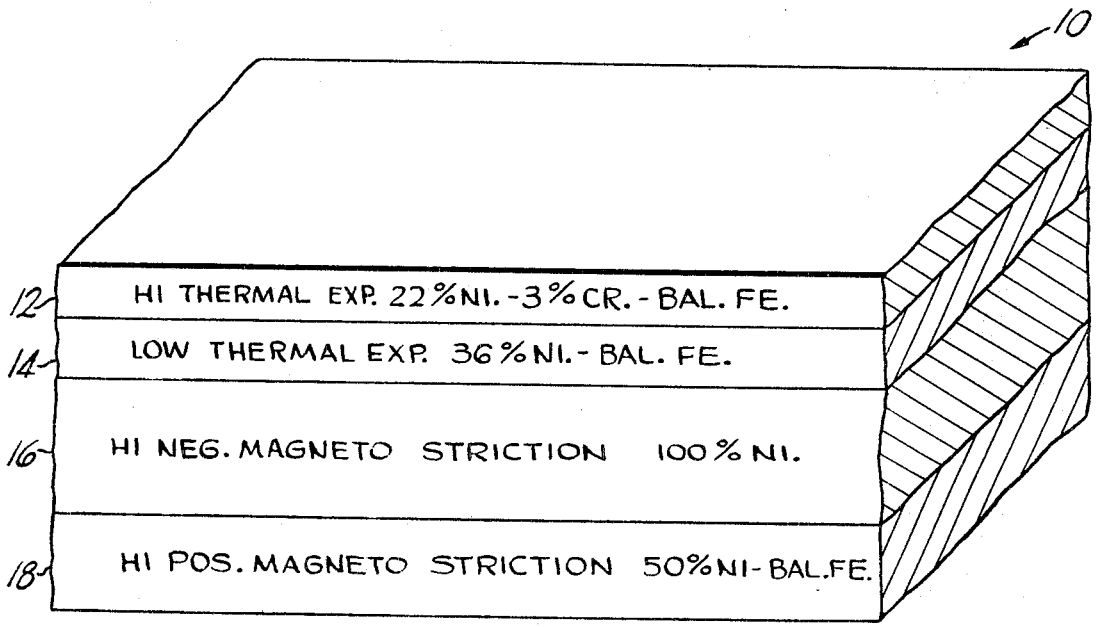
FIG. 1 is a fragmentary perspective view of one embodiment of the combined thermoflexural and magnetoflexural material of this invention.

With reference to the drawing, the combined thermoflexural and magnetoflexural material of this invention, indicated generally at 10, is illustrated in the embodiment of the invention shown in FIG. 1 as consisting of four laminations 12, 14, 16 and 18. The laminations 12, 14, 16 and 18 are positioned in surface-to-surface contact and secured together by any suitable bonding process so that they constitute an integral whole. In the illustrated embodiment of the invention, the laminations 12 and 14 coact to provide for lateral deflection of the material 10 in response to a temperature change. The lamination 12 is characterized by its having an extremely high coefficient of thermal expansion, and the lamination 14 is characterized by its having an extremely low thermal coefficient of expansion. The laminations 16 and 18 coact to provide for lateral deflection of the material 10 in the presence of a magnetic field. Accordingly, the lamination 16 has an extremely high negative coefficient of magnetostriction and the lamination 18 has an extremely high positive coefficient of magnetostriction.

As an example of the material 10, the lamination 12 can be formed of an alloy consisting essentially of 22% Ni, 3% Cr and balance Fe, the lamination 14 can be formed of an alloy consisting essentially of 36% Ni and balance Fe, the lamination 16 can be formed of substantially 100% nickel, and the lamination 18 can be formed of an alloy consisting essentially of 50% Ni and balance Fe.

Figure 2:
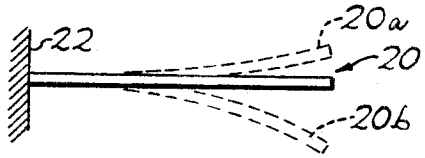
FIG. 2 is a diagrammatic view illustrating the deflection of an element formed from the material of this invention.

In FIG. 2, an element 20 formed of the material 10 is illustrated as being fixedly mounted at one end on a support 22. In the presence of a magnetic field, the element 20 may deflect laterally to the position indicated at 20a while when the element 20 is heated it may deflect in the opposite direction to the position indicated at 20b. In the event the same condition that provides the magnetic field provides for heating of the element 20, for example, when it is used as a circuit breaker, the fact that the magnetostrictive laminations 16 and 18 tend to deflect the element 20 in a direction opposite the direction in which the thermally responsive laminations 12 and 14 tend to deflect the element when it is heated, is not harmful because the magnetic field will saturate while the thermal response is not limited. It is to be understood, of course, that the magnetostrictive laminations 16 and 18 can provide for deflection of the element 20 in the same direction in which it deflects in response to a temperature increase, this effect being dependent upon the materials selected for the laminations and their relative arrangement in the material 10.

Figure 3:
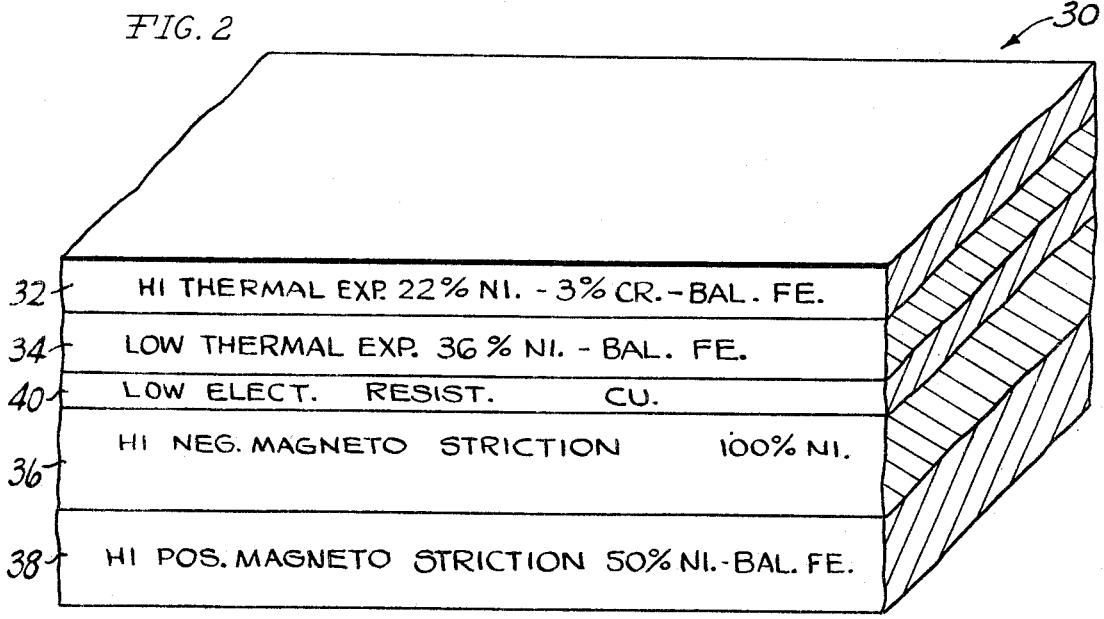
FIG. 3 is a perspective view of another embodiment of the material of this invention, illustrated similarly to FIG. 1.

In FIG. 3, a modified form of the material of this invention is indicated generally at 30. The material 30 consists of laminations 32, 34, 36 and 38 corresponding to the laminations 12, 14, 16 and 18, respectively, in the material 10. In the material 30, an additional lamination 40 is provided and this lamination is disposed intermediate the laminations 34 and 36. The lamination 40 is characterized by a suitable electrical resistivity to thereby modify the current carrying capabilities of the material 30 relative to the material 10. A material suitable for the lamination 40 is copper. The lamination 40 is preferably incorporated in the material 30 adjacent the center thereof since it will not assist in providing for lateral deflection of the material 30, as illustrated for the element 20 in FIG. 2. By placing the lamination 40 near the neutral axis of an element 20 formed from the material 30, the extent to which the lamination 40 will impede the deflection of the element 20 is reduced to a minimum.

From the above description it is seen that this invention provides an improved laminated material which is both thermoflexural and magnetoflexural by virtue of the inclusion therein of the four laminations illustrated in FIG. 1. Two of these laminations are specifically provided for co-action to obtain response of the material to a magnetic field. An additional two of the laminations are for the specific purpose of providing for a thermal response of the material. The laminations are disposed with respect to one another and have relative thicknesses selected so as to maximize the combined thermal and magnetic flexivity. For this reason, the illustrated arrangement and proportioning of the laminations 12, 14, 16 and 18 is for illustrative purposes only and is not to be considered as limiting. Irrespective of how the laminations are arranged in the material, they are joined by diffusion welding or other suitable manner in a substantially continuous manner over their contiguous surfaces to form an integral composite material. While the many applications of this material cannot at present be foreseen, an important application is in the manual reset or similar circuit breaker in which a current sensitive element releases or trips a contact carrying element, opening the circuit, as shown in the aforementioned patent application. In such case the magnetic field induced by an overload current develops a magnetoflexural moment in the material which enhances its thermal flexivity causing the circuit breaker to open at a faster rate. Furthermore, since the magnetoflexural response time is much shorter than the thermal response time, the magnetically produced motion of the element formed from the element 10 serves to overcome the static friction of the latch, reducing required thermal bending moment and still further accelerating the circuit breaker action. In such an environment, the element may be improved by forming of the material 30 with the copper lamination 40 since low electrical resistivity is often required in the sensitive element for high current circuit breakers.

It will be understood that the combined thermoflexural and magnetoflexural material which is herein disclosed and described is presented for purposes of explanation and illustration and is not intended to indicate limits of the invention, the scope of which is defined by the following claims.

What is claimed is:

1. A laminated strip adapted to respond both to changes in temperature and to the presence of a magnetic field, said material comprising first, second, third and fourth laminations which are flexible and ductile and which are metallurgically bonded to each other in surface to surface contact in the order named, one of the first two laminations having a very low coefficient of thermal expansion, the other of the first two laminations having a very high coefficient of thermal expansion, one of the other two laminations having a very high positive magnetostrictive coefficient, the other of the other two laminations having a very high negative megnetostrictive coefficient, whereby the strip will deflect laterally when changes in temperature ensue and when a magnetic field is present.

2. A strip as set forth in claim 1 further including a fifth lamination which is flexible and ductile, said fifth lamination being disposed between the second and third laminations and being metallurgically bonded thereto in surface to surface contact, said fifth lamination being characterized by a low value of electrical resistance.

3. A strip as set forth in claim 1 wherein the high coefficient of thermal expansion lamination is an alloy consisting essentially of 22% Ni, 3% Cr. balance Fe, the low coefficient of thermal expansion lamination is an alloy consisting essentially of 36% Ni, balance Fe, the positive magnetostrictive coefficient lamination is an alloy consisting essentially of 50% Ni, balance Fe, and the negative magnetostrictive coefficient lamination is an alloy consisting essentially entirely of Ni.

References Cited
UNITED STATES PATENTS 2,983,998  5/1961  Cherreau _____ 29—195.5
3,219,423  11/1965  Sears _____ 29—195.5

HYLAND BIZOT, Primary Examiner

U.S. Cl. X.R.
29—194, 196.6